March 24, 1931.    R. C. McCLAY    1,797,582
REAMER
Filed Dec. 1, 1925

Inventor.
Roy C. McClay.

By
Attorney.

Patented Mar. 24, 1931

1,797,582

UNITED STATES PATENT OFFICE

ROY C. McCLAY, OF LOS ANGELES, CALIFORNIA, ASSIGNOR OF ONE-HALF TO CARLIN EASTWOOD

REAMER

Application filed December 1, 1925. Serial No. 72,451.

My invention primarily relates to a machine by means of which the cylinders of explosion engines can be bored without dismantling the engine, and while primarily designed for that purpose my machine can be used to bore other cylindrical structures such as tubes and pipes; and the object of my invention is to provide an efficient and easily operated machine for that purpose.

Figure 1:
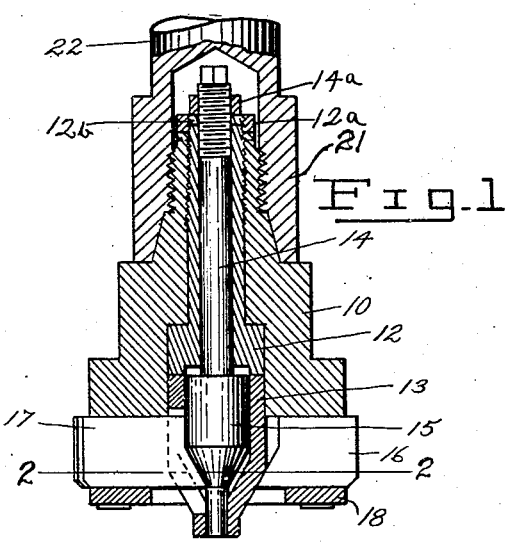

In the drawings forming a part of this application Fig. 1 is a central vertical section partly broken away of the reaming portion of the machine and parts in elevation.

Figure 2:
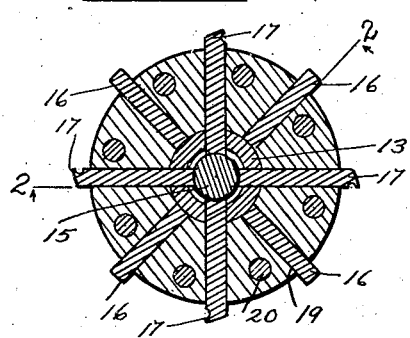
Figure 3:
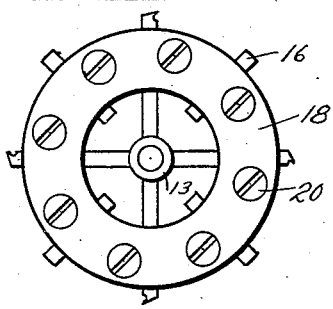

Fig. 2 is a section on the line 2—2 of Fig. 1,
Fig. 3 is a bottom view of Fig. 1.

Referring to the drawings the reamer consists of a reamer body 10 having a stepped hollow bore therein, the upper end of which is internally and externally threaded. In the bore of body 10 is mounted a stepped hollow follower 12 which is externally and internally threaded at the top and has a kerf 12b in the top. The lower end of follower 12 engages the top of the hollow guide bar expander 13 whose lower end is conical. Within the follower and the expander is the cutter blade expander having a body 14 whose upper end is externally threaded and screws into the upper end of the follower and a head 15 the upper and lower portions of which are cylindrical with the lowest portion considerably reduced. The portion between the upper and lower cylindrical portions is the frustum of a cone and does the expanding. The lower portion of body 10 is radially slotted as best shown in Fig. 2 for the reception of the guiding bars 16 and the cutter blades 17. A portion of the inner ends of the guiding bars and the cutter blades is on a slope that registers with the conical portions of the expanders. An annular ring 18 closes the bottom of slots 19 and is held positioned thereon by screws 20 which are loosened when the guide and cutter blades require adjusting or grinding and tightened after adjustment to hold the blades firmly in place. Lock nuts 12a and 14a hold 12 and 14 against movement after the blades are adjusted. The upper end of 10 screws into the hollow head 21 of the mandrel 22 which is vertically movable through frame 23.

Having described my invention, I claim:

1. A reamer comprising a hollow stepped body radially slotted at the bottom and externally and internally threaded at the top; guide bars and cutter blades mounted in said slots, the cutter blades being longer than the guide bars and lying in the same transverse plane, the inner ends of said blades having a beveled portion; a slotted hollow guide bar expander having a portion conical in said body, through whose slots the ends of the cutter blades pass; a hollow follower having its top in threaded engagement with the top of the body; a cutter blade expander having a portion conical in the guide bar expander, said cutter blade expander passing through said follower and guide bar expander; an annular ring secured upon the bottom of said body; and means to hold said parts in their operative positions.

2. A reamer comprising a hollow body having radial slots in the same transverse plane in the lower portion thereof; guide bars and cutter blades mounted in alternation in said slots in the same transverse plane; means to position said guide bars; means to position said cutter blades, said blades passing through the guide bar positioning means; and means to hold said bars positioned in said slots.

In witness that I claim the foregoing I have hereunto subscribed my name this 24th day of November, 1925.

ROY C. McCLAY.